Oct. 13, 1953  L. R. BEAVIN  2,655,349
AUTOMOBILE HEATING AND COOLING APPARATUS
Filed Nov. 10, 1950  2 Sheets-Sheet 1
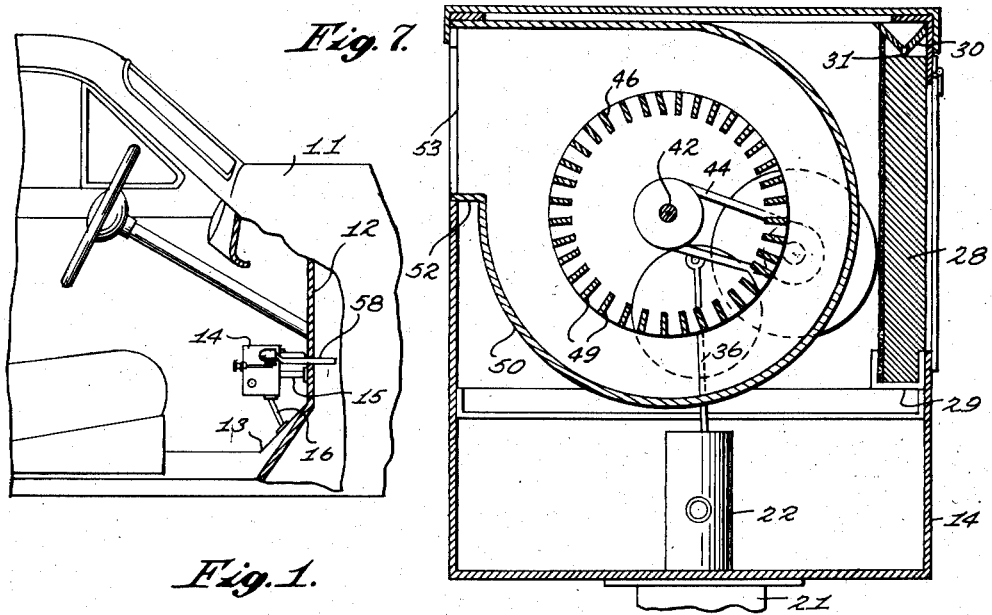
Fig. 7.
Fig. 1.
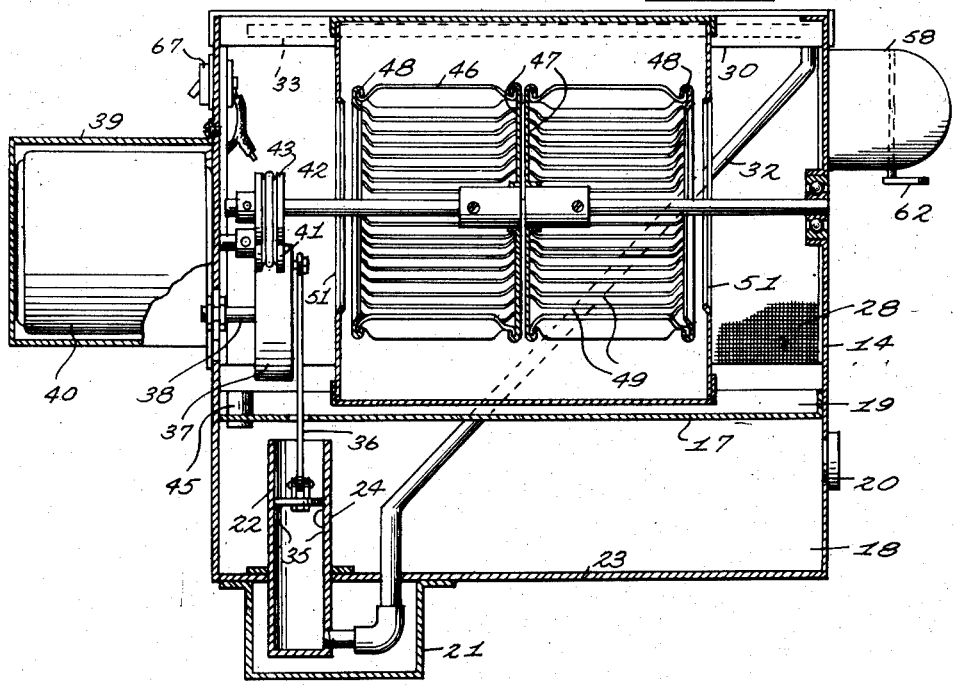
Fig. 6.
INVENTOR.
LEWIS R. BEAVIN
BY
McMorrow, Berman & Davidson
ATTORNEYS

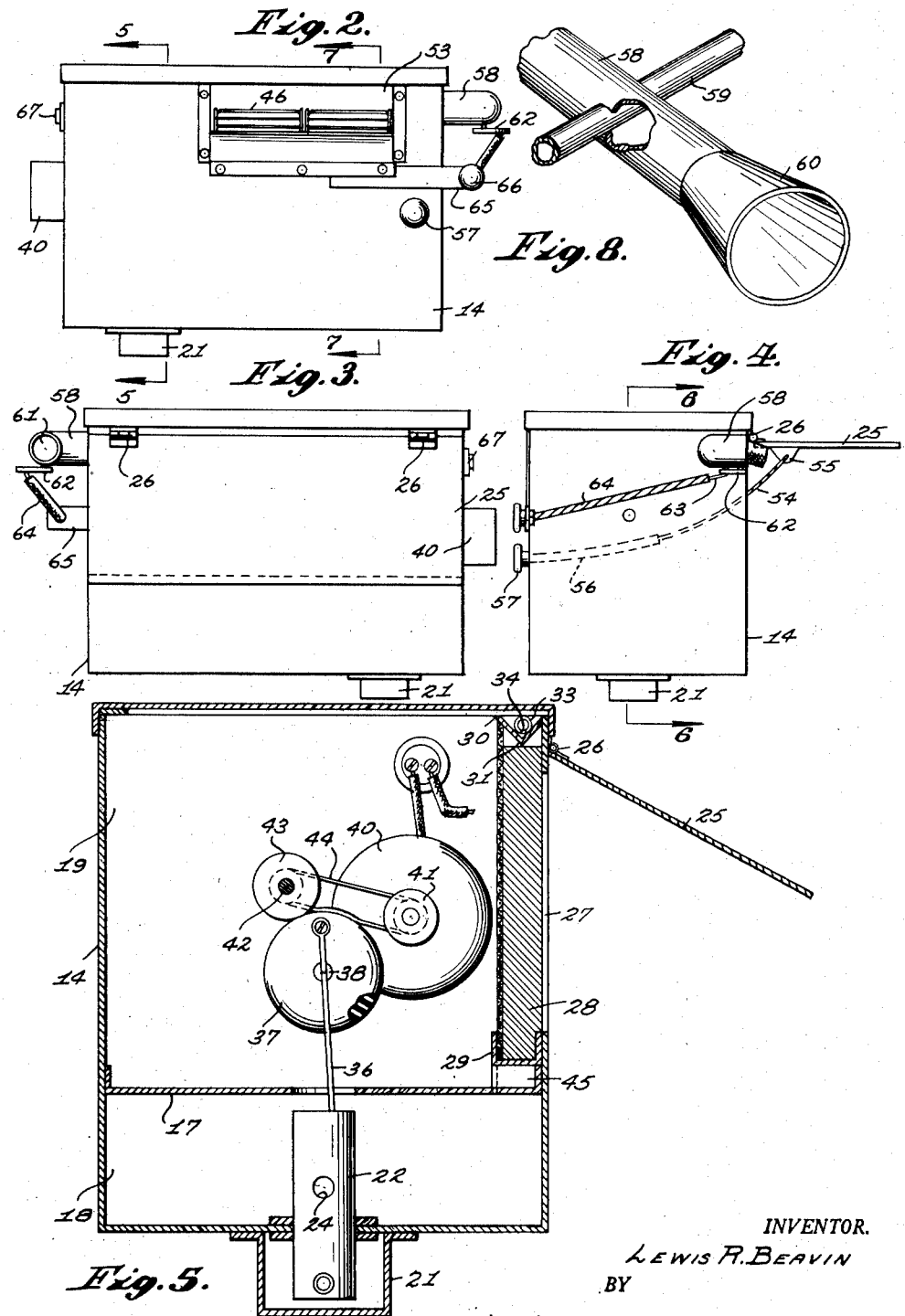

Patented Oct. 13, 1953

2,655,349

UNITED STATES PATENT OFFICE 2,655,349

AUTOMOBILE HEATING AND COOLING APPARATUS

Lewis R. Beavin, Oklahoma City, Okla.

Application November 10, 1950, Serial No. 195,079

1 Claim. (Cl. 257—138)

This invention relates to air conditioning devices, and more particularly to air conditioning apparatus for use in motor vehicles.

A main object of the invention is to provide a novel and improved air conditioning apparatus for installation in an automobile, said apparatus being simple in construction, involving relatively few parts, and providing selective treatment of the air in the vehicle, whereby either heating or cooling of the air in the vehicle may be obtained.

A further object of the invention is to provide an improved air conditioning apparatus for motor vehicles which is simple to install, which is sturdy in construction, which involves relatively inexpensive components, which is easy to operate, and is easy to maintain in repair.

Further objects and advantages of the invention will become apparent during the following description and claim, and from the accompanying drawings, wherein:

Figure 1 is a fragmentary side elevational view, partly in cross-section, of a portion of an automobile showing an improved air conditioning apparatus according to the present invention installed therein;

Figure 2 is a front elevational view of the main housing of the air conditioning apparatus of Figure 1;

Figure 3 is a rear elevational view of the main housing of the apparatus shown in Figure 1;

Figure 4 is an end elevational view of the main housing of the air conditioning apparatus of Figures 1, 2 and 3, the air intake flap of the housing being shown in open position;

Figure 5 is an enlarged vertical transverse cross-sectional view taken through the housing on the line 5—5 of Figure 2;

Figure 6 is an enlarged cross-sectional view taken on the line 6—6 of Figure 4;

Figure 7 is an enlarged cross-sectional view taken on the line 7—7 of Figure 2;

Figure 8 is a fragmentary perspective detail view showing the air intake conduit of the air conditioning apparatus and the manner in which said conduit surrounds a portion of the exhaust pipe of the automobile.

Referring to the drawings, 11 designates a conventional automobile having the usual passenger compartment which includes the fire wall 12 and the footboard 13. Designated at 14 is the main housing of an air conditioning apparatus according to the present invention, said housing being secured to the fire wall 12, and the footboard 13 by suitable brackets, shown at 15 and 16. As shown in Figure 1, the housing 14 is supported in the lower portion of the passenger compartment adjacent the fire wall 12, but within easy reach of the driver's seat of the automobile.

The housing 14 may be generally rectangular in shape, as shown in Figures 6 and 7, and may be provided with a horizontal partition wall 17 defining a lower compartment 18 and an upper compartment 19. The lower compartment 18 defines a water reservoir which may be filled with water by means of a filler plug, shown at 20. The lower portion of the housing is provided with a sump or well, shown at 21, and designated at 22 is a vertical cylinder which is secured in the bottom wall 23 of the housing and which projects into the sump or well 21. The cylinder 22 is formed in its upper portion with an opening 24 which communicates with the compartment 18. The rear wall of the housing 14 is provided with a hinged flap 25, hinged at 26, and adapted to cover a rectangular opening 27 in said rear wall. Mounted in the housing adjacent the opening 27 is an enlarged screen 28 of suitable porous material, such as metal wool or other suitable porous, moisture-absorbent material, the lower marginal portion of the screen being mounted in a channel-shaped trough 29. Mounted in the housing and disposed over the top marginal portion of the screen 28 is a V-shaped trough 30 formed with perforations in its bottom, shown at 31. Designated at 32 is a conduit which extends diagonally through the housing, as shown in Figure 6, and is formed at its top portion with a horizontal section 33 located in the trough 30, said section 33 being formed along its length with perforations 34. The lower end of the conduit 32 is connected to the bottom portion of the cylinder 22, as shown in Figure 6.

Slidably mounted in the cylinder 22 is piston 35 connected by a link rod 36 to the peripheral portion of a rubber disc 37 rotatably mounted on a shaft 38 secured to the side wall of the housing 14. Mounted on said side wall is an auxiliary housing 39 in which disposed a motor 40 whose shaft projects through the adjacent side wall of the housing into the compartment 19 and has a pulley 41 mounted thereon. Journaled in the housing between the side walls thereof is a horizontal shaft 42 which carries a pulley 43. Designated at 44 is a belt which couples the pulley 41 to the pulley 43. Belt 44 is in frictional engagement with the periphery of the disc 37, whereby said disc is rotated responsive to the energization of the motor 40, causing the link rod 36 to reciprocate the piston 35 in the cylinder 22. Reciprocation of the piston 35 provides a pumping action which forces water from the compartment 18 upwardly through the conduit 32 into the horizontal perforated conduit section 33, whereby the water is distributed into the trough 30 and descends through the openings 31 in said trough into the filter 28, thereby soaking said filter with water. The water seeps through the filter 28 and drips into the trough 29. Said trough is provided with a depending discharge conduit portion 45 which extends through the partition 17 into the reservoir section 18 of the housing, whereby the water drains into said reservoir section.

Secured on the intermediate portion of the shaft 42 is a vaned blower rotor 46, said rotor comprising a pair of sections, each section having an inner disc portion 47 and an outer rim portion 48. Secured to the periphery of the disc 47 and the outer rim portion 48 of each section are the radial vanes 49. Secured in the compartment 19 is the inner shell or housing 50 which is provided at its sides with air intake openings 51 and which is provided with an air discharge conduit portion 52 discharging through the front wall of the housing 14 at 53, as shown. When the motor 40 is energized, the blower rotor 46 is rotated, causing air in the housing chamber 19 to be blown outwardly through the opening 53 into the passenger compartment of the automobile. When the flap 25 is in open position, as shown in Figures 4 and 5, air from the passenger compartment is drawn into the chamber 19 through the moist filter 28 and is cooled by evaporation of moisture from said filter. Said air is then discharged through the opening 53 into the passenger compartment, said air having been cooled by its contact with the moist filter 28. The position of the flap 25 is controlled by a flexible cable 54 connected to a lug 55 on the flap and which extends slidably through a sleeve 56 secured to the housing 14. Secured to the end of the cable 54 is a knob 57 which is located at the front of the housing, as shown in Figure 2. As viewed in Figures 2 and 4, the flap 25 may be opened by pushing the knob 27 until it comes into abutment with the front wall of the housing 14. Conversely, by pulling the knob 27 back, the flap 25 may be moved to closed position, as shown in Figure 3.

Designated at 58 is a conduit which is connected to the upper portion of one of the side walls of the housing 14, as shown in Figure 6, and which extends through the fire wall 12 into the motor compartment of the vehicle. As shown in Figure 8, the conduit 58 surrounds a portion of the exhaust pipe 59 of the motor vehicle, the conduit 58 being provided at its end with an open, forwardly flaring scoop portion 60 which faces forwardly and into which air flows as the vehicle moves in a forward direction. This air is warmed by contact with the exhaust pipe 59 and passes into the housing 14 through the conduit 58. The opening and closing of conduit 58 is controlled by a flap valve 61 rotatably mounted in said conduit adjacent its connection to the housing 14, said valve being provided with an external operating lever 62. Connected to the lever 62 is a flexible shaft 63 extending slidably through a sleeve 64 secured to housing 14, and connected to the housing 14 by an outwardly extending bar member 65 secured to the front wall of the housing. Secured to the end of the flexible shaft 63 is a knob 66 which is located adjacent the knob 57, as shown in Figure 2.

It will be apparent that the operator of the vehicle may obtain either cooling or warming of the air inside the passenger compartment by operating either of the knobs 57 or 66. Operation of the knob 57 opens the flap 25, allowing the air in the compartment to be cooled by being circulated through the moist filter 28, as above described. Operation of the knob 66 controls the intake of warm air from the conduit 58 into the blower chamber 19 of housing 14.

Designated at 67 is a switch mounted on the side wall of the housing 14 and connected in circuit between the "hot" terminal of the motor 40 and the automobile battery. When warm air is desired inside the passenger compartment, the switch 67 may be open, deenergizing the motor 40, and allowing the warm air to enter the passenger compartment merely by the opening of the flap valve 61. Of course, the warm air may be moistened, if so desired, by closing the switch 67, whereby the pump in the reservoir compartment 18 forces water upwardly through the conduit 32 and into the trough 30, whereby the screen 28 is moistened. With the flap 25 in open position, the air in the passenger compartment may be circulated through the moistened screen 28, whereby moisture is introduced into the air.

While a specific embodiment of an improved air conditioning apparatus for motor vehicles has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle, an air conditioning apparatus comprising a housing mounted in the vehicle passenger compartment, a water reservoir in said housing, the rear wall of said housing being formed with an inlet opening, a porous screen coextensive with said opening, a perforated trough mounted in said housing over the top edge of said screen, a conduit connecting the reservoir to the trough, a pump connected to said conduit and arranged to force water from the reservoir therethrough, conduit means connecting the lower portion of the screen with said reservoir, said housing being formed with an outlet opening in the front wall of said housing, a shaft extending transversely of said housing, a blower mounted on said shaft between screen and said outlet opening, an auxiliary housing located adjacent one side of the first-named housing, an electric motor mounted in said auxiliary housing, means projecting into said first-named housing drivingly coupling said motor to said pump and blower, a cover flap hinged to the first-named housing and arranged to overlie said screen, a first flexible shaft slidably carried by said first-named housing and connected to said cover flap, the side wall of said first-named housing being provided with an opening adjacent the intake side of the blower, an air intake conduit connected to said last-named opening, heating means in said last-named conduit, a flap valve pivotally mounted in said last-named conduit, an external operating lever connected to said flap valve, and a second flexible shaft slidably carried by said first-named housing and connected to said lever.

LEWIS R. BEAVIN.

References Cited in the file of this patent

UNITED STATES PATENTS

| Number | Name | Date |
|---|---|---|
| 1,704,971 | Howell | Mar. 12, 1929 |
| 1,903,037 | Fraver | Mar. 28, 1933 |
| 1,946,887 | Sipe | Feb. 13, 1934 |
| 1,992,340 | Wittmann et al. | Feb. 26, 1935 |
| 2,026,929 | Backe | Jan. 7, 1936 |
| 2,032,553 | Spoelstra | Mar. 3, 1936 |
| 2,277,522 | Kneedler | Mar. 24, 1942 |
| 2,285,725 | Kneedler | June 9, 1942 |